United States Patent
Wu et al.

(10) Patent No.: US 9,426,079 B2
(45) Date of Patent: Aug. 23, 2016

(54) RETRANSMISSION AND MEMORY CONSUMPTION TRACKING OF DATA PACKETS IN A NETWORK DEVICE

(71) Applicant: Broadcom Corporation, Irvine, CA (US)

(72) Inventors: David Wu, San Diego, CA (US); Darren Duane Neuman, Palo Alto, CA (US); Flaviu Dorin Turean, Palo Alto, CA (US); Rajesh Shankarrao Mamidwar, San Diego, CA (US); Anand Tongle, San Diego, CA (US); Sanjeev Sood, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 187 days.

(21) Appl. No.: 14/042,655

(22) Filed: Sep. 30, 2013

(65) Prior Publication Data
US 2015/0063358 A1 Mar. 5, 2015

Related U.S. Application Data

(60) Provisional application No. 61/873,770, filed on Sep. 4, 2013.

(51) Int. Cl.
*H04L 12/807* (2013.01)
(52) U.S. Cl.
CPC ..................................... *H04L 47/27* (2013.01)
(58) Field of Classification Search
CPC .............................. H04L 47/34; H04L 47/27

USPC .......................................................... 270/394
See application file for complete search history.

(56) References Cited

U.S. PATENT DOCUMENTS

2005/0198028 A1* 9/2005 Padmanaban ........... H04L 1/187
2011/0103403 A1* 5/2011 Derom ................... H04L 1/1832
370/475

* cited by examiner

*Primary Examiner* — Pao Sinkantarakorn
*Assistant Examiner* — Richard Chang
(74) *Attorney, Agent, or Firm* — McDermott Will & Emery LLP (57) ABSTRACT

A method of handling retransmission and memory consumption tracking of data packets includes storing data packets from different data channels in respective transmitter ring buffers allocated to the data channels when the data packets are not marked for retransmission, and facilitating retransmission of data packets from a specified ring buffer corresponding to a retransmission sequence number. The method also may include storing received data packets out of sequence in respective receiver ring buffers, marking a descriptor indicating a tail location of the stored data packets, and reclaiming memory space in the ring buffer based on the marked descriptor. The method may include storing a payload address associated with received data packets, marking a descriptor associated with the payload address to indicate the stored data packets have been consumed for processing, and reclaiming memory space when a register contains an indication of the stored payload address based on the marked descriptor.

20 Claims, 5 Drawing Sheets

RETRANSMISSION AND MEMORY CONSUMPTION TRACKING OF DATA PACKETS IN A NETWORK DEVICE

CROSS-REFERENCE TO RELATED APPLICATIONS

The present application claims the benefit of U.S. Provisional Patent Application Ser. No. 61/873,770, titled "RETRANSMISSION AND MEMORY CONSUMPTION TRACKING OF DATA PACKETS IN A NETWORK DEVICE," filed on Sep. 4, 2013, which is hereby incorporated by reference in its entirety for all purposes.

TECHNICAL FIELD

The present description relates to data stream flow management, and more particularly, but not exclusively, to retransmission and memory consumption tracking.

BACKGROUND

A gateway device, such as a set-top box (STB) gateway, includes buffer space (e.g., a memory) that is allocated to store transmitted data packets (e.g., video, audio, or multimedia packets) for retransmission purposes. The buffer space may be deallocated when an acknowledgement packet is received in response to the transmitted data packet. The buffers that store the transmitted packets may be scattered throughout the memory. As a result, there may be processing complexity associated with allocating/deallocating and managing the buffers.

In the gateway device, received packets may be inserted into a ring buffer in the order the packets are received. However, the packets may be received out of sequence. Thus, it may be difficult to determine how much of the ring buffer has been consumed and can be reclaimed. In some approaches, a sweep and mark procedure is performed where each item in the ring buffer is examined and marked if the item has been consumed. The marked items are then cleared. Since each item in the ring buffer is examined (e.g., a read operation from memory), the sweep and mark procedure may require a large number of memory accesses.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject disclosure provides a system and method of handling retransmission packets using a ring buffer to reduce the complexity of tracking a sequence number in transmitted segments for retransmission.

In some implementations, a method of handling retransmission of data packets is provided. The method may include transmitting data packets on multiple data channels; for each of the data channels, determining if one or more of the data packets corresponding to the data channel is marked for retransmission; storing the one or more data packets corresponding to the data channel in a respective one of memory buffers allocated to the data channels if the one or more of the data packets are not marked for retransmission; determining a retransmission sequence number within a transmission sliding window; retrieving the stored data packets from the respective one of memory buffers based on the retransmission sequence number; and retransmitting the retrieved data packets with the retransmission sequence number within a retransmission segment of the transmission sliding window.

The subject disclosure also provides a system and method of tracking memory consumption in a data structure (e.g., circular and non-circular ring buffers) that includes pointers to addresses of data items stored in memory to reduce the number of memory accesses necessary to reclaim the consumed memory. A flag may be set and any data items having a sequence number lower than a sequence number pointed to by the flag is cleared. Another flag can be set to indicate how many data items have been consumed from the memory.

In certain aspects, a method of tracking memory consumption is provided. The method may include receiving data units (or chunks) out of sequence on a particular data channel; storing the data units in a memory buffer associated with the particular data channel in the received sequence; determining a tail location associated with the data units in the memory buffer; determining if the tail location corresponds to an initial segment of the data units that precedes later segments of the data units having a different order in the sequence; marking a descriptor with an indication to advance the tail location in the memory buffer if the tail location is determined to correspond to the later segments that are subsequent to the initial segment; and reclaiming all segments in the memory buffer based on the marked descriptor.

In some implementations, another method of tracking memory consumption is provided. The method may include determining Internet Protocol (IP) datagrams stored out of sequence in respective memory buffers of a shared memory; storing a payload address associated with each of the IP datagrams in a data structure with a specified received order, in which the IP datagram is associated with a descriptor includes the payload address; marking the descriptor with an indication that the IP datagram has been consumed for packet processing; providing the payload address of the IP datagram to a register based on the indication; retrieving a stored payload address from the register, in which the register is updated with a different payload address of each consumed IP datagram; and reclaiming memory space in the data structure corresponding to the stored payload address.

In this regard, the complexity of managing the retransmission buffers is greatly reduced, e.g. instead of allocating/deallocating memory for every packet, the location in the ring buffer at which point the audio-video (AV) data can be overwritten is identifiable from the largest sequence number of a received acknowledgment packet. In addition, the size of the buffered AV data (e.g., size of the buffer space) available for each memory access may be maximized to reduce the number of memory accesses.

Figure 1:
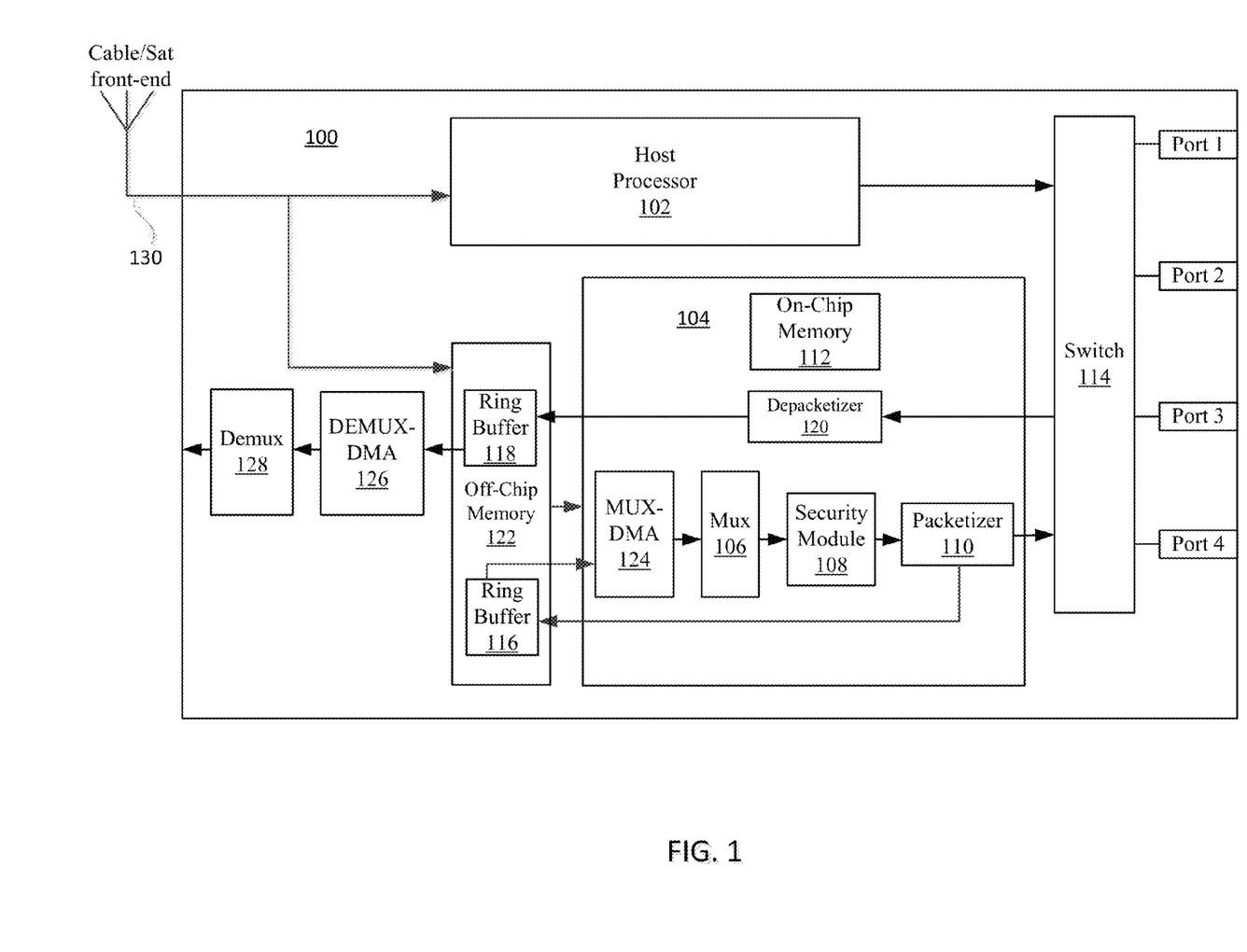
FIG. 1 illustrates an example of a network device, in accordance with various aspects of the subject technology.

FIG. 1 illustrates an example of a network device 100, in accordance with various aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

A network device 100 is provided that includes a host processor 102 and a dedicated processor and associated hardware and firmware that exclusively handle AV network traffic, e.g., an advanced stream processor (ASP) 104, for efficient network processing of AV network traffic in addition to host processor 102 that handles non-AV network traffic. ASP 104 is configured to process AV network traffic e.g., packets or traffic that include or are related to AV data, over one or more channels. An entity, e.g. a software entity, running on host processor 102 is configured to work in conjunction with a network switch (e.g., switch 114) to receive and route the network traffic to either ASP 104 or host processor 102, depending on whether the network traffic includes AV network traffic or non-AV network traffic. Accordingly, ASP 104 exclusively handles network connections associated with AV network traffic while host processor 102 handles network connections corresponding to non-AV network traffic, thereby offloading a significant amount of processing from host processor 102 to ASP 104.

Since ASP 104 operates as a dedicated engine, separate from host processor 102, ASP 104 can access the video transport streams of the AV network traffic "in the clear," e.g. free of any encryption or other digital rights management (DRM) mechanisms, while host processor 102 can only access the encrypted or otherwise protected AV transport streams. Thus, ASP 104 can access parameters and values associated with the video transport streams, such as transmitter timestamp (TTS) values, presentation time stamp (PTS) values, program clock reference (PCR) values, continuity counter values, or descriptor timestamp values. In addition, ASP 104 can access transmission parameters and data type values associated with outgoing AV transport streams. Accordingly, ASP 104 may be able to perform retransmission handling of individual AV transport streams as well as memory consumption tracking, since ASP 104 can access the parameters and values carried by the AV transport streams (even when received encrypted), whereas host processor 102 alone is unable to perform data rate control of the AV transport streams when they are received encrypted.

As shown in FIG. 1, ASP 104 may receive AV network traffic from the cable/satellite front-end 130, while host processor 102 may receive non-AV network traffic from the cable/satellite front-end. The cable/satellite front end 130 may include one or more other devices and/or connections for receiving AV content via a coaxial transmission network, via satellite, via antenna, and/or via any other transmission network. ASP 104 may receive AV network traffic from encoders (not shown) or an AV storage device (not shown).

Network device 100 also includes switch 114 that receives the processed AV network traffic from ASP 104 and/or the processed non-AV network traffic from host processor 102. Switch 114 may route this traffic to their intended destinations via one or more ports (e.g., shown in FIG. 1 as port 1, port 2, port 3, and port 4) that may be coupled to one or more physical network ports, such as an Ethernet port, a multimedia over coax alliance (MoCA) port, or reduced gigabit media independent interface (RGMII) port. The destinations may include one or more downstream client devices operably connected to network device 100, such as different televisions, tablets, laptop computers, desktop computers, mobile phones, or any suitable computing device for receiving the AV network traffic. In one or more implementations, switch 114 may be integrated on-chip. Although network device 100 is illustrated as including components for facilitating data flow from the processors to switch 114, it is understood that network device 100 may include other components (not shown) for facilitating data flow in the opposite direction (e.g., from switch 114 to the processors).

ASP 104 includes multiplexer 106, security module 108, packetizer 110, on-chip memory 112, depacketizer 120 and MUX-DMA (multiplexer-direct memory access) 124. Multiplexer 106 may receive AV data units (e.g., transport stream packets) via MUX-DMA 124, and store the AV data units in on-chip memory 112, off-chip memory (e.g., random access memory such as dynamic random access memory (DRAM)), and/or other suitable locations. Network device 100 also includes DEMUX-DMA 126 and Demultiplexer 128. Demultiplexer 128 may receive AV data or non-AV data from off-chip memory 122 via DEMUX-DMA (demultiplexer-direct memory access) 126. In some aspects, Demultiplexer 128 receives an output from ring buffer 118.

As shown in FIG. 1, Multiplexer 106 receives data channels carrying different data types. By way of example, Multiplexer 106 can receive transport stream packets marked for regular transmission, and in addition, Multiplexer 106 can receive a retransmission payload marked for retransmission carried on separate dedicated channels. As such, Multiplexer 106 acts as a single point of entry for all AV streams including packets marked for retransmission. In this respect, the rate of each AV stream entering Multiplexer 106 can be individually controlled and substantially lossless transmission of the AV packets can be provided.

Security module 108 may encrypt or otherwise apply security to the data units received from Multiplexer 106. Security module 108 may include an encryption unit that encrypts or otherwise applies security to the data units received from Multiplexer 106. Security module 108 also may include buffers for storing the data units.

Packetizer 110 (e.g., an Ethernet packetizer) may receive the data units from security module 108 and packetize the data units (e.g., encapsulate the data units in a payload and add headers to generate packets of data for transmission). Packetizer 110 may include one or more packetizing units that packetize the data units. Packetizer 110 also may include buffers for storing the packetized data units. Packetizer 110 also may include an output unit that distributes the packetized data units to switch 114. In one or more implementations, packetizer 110 generates Ethernet frames to be transmitted by network device 100. For example, static header information corresponding to each channel for transmission may be stored in off-chip memory, such as DRAM, or in on-chip memory, such as on-chip buffer 112. The static header information may include Ethernet header information, IP header information, and/or TCP/UDP/RTP header information. Packetizer 110 retrieves the static header information from memory, adds dynamic header information (e.g., sequence number, incremental timestamps, etc.), and packages the payload data (e.g., retrieved from DRAM) to generate an Ethernet frame for transmission. Thus, according to certain aspects, the subject system provides for a single framing stage, rather than multiple stages for each header. Switch 114 may receive the packets of data from packetizer 110 and route the packets to their intended destinations.

The depacketizer 120 may extract headers from the packets based at least on the channels associated with the packets, e.g. based on header processing configuration information for each channel that is stored in the on-chip memory 112. The depacketizer 120 may generate a header information item from each extracted header. A header information item may be a data structure that includes information extracted from the header of the packet and that also includes the size of the payload of the packet, and memory location information for accessing the payload in the off-chip memory 122, e.g. the starting address at which the payload will be stored in the off-chip memory 122.

Switch 114 may include a packet forwarding engine that receives the data units from an output unit and places them in corresponding outbound queues. From the outbound queues, the data units may be routed to their intended destinations. Each of the outbound queues may be associated with a corresponding buffer. For example, a data unit stored in a buffer associated with a first channel may be placed in a corresponding outbound queue for the first channel. According to certain aspects, one or more of the outbound queues may be dedicated for storing AV traffic. The outbound queues dedicated for storing AV traffic may have higher priority for scheduling transmissions than outbound queues for storing non-AV traffic.

The off-chip memory 122 may be, or may include, one or more memory modules, such as dynamic random-access memory (DRAM), double data rate synchronous dynamic random-access memory (DDR SDRAM), and/or any other suitable memory modules. For explanatory purposes, the off-chip memory 122 is illustrated as a single block; however, the off-chip memory 122 may be, and/or may include, several separate individual memory modules, or several separate partitions of one or more memory modules. In one or more implementations, the off-chip memory 122 may be referred to as "off-chip" because the memory modules of the off-chip memory 122 may be on a separate semiconductor chip than the AV stream processor 104 and the components thereof, e.g. the memory modules of the off-chip memory 122 may be external to the AV stream processor 104 and consequently the components thereof. In one or more implementations, the off-chip memory 122 may be on the same PCB, or a different PCB, as the AV stream processor 104.

Ring buffers 116 and 118 may be data structures configured to use a single, fixed-size buffer for each AV channel as if ring buffers 116 and 118 were connected end-to-end. Ring buffers 116 and 118 may sometimes be referred to as circular buffers or cyclic buffers. In some aspects, ring buffers 116 and 118 are non-circular buffers. In some aspects, ring buffers 116 and 118 are implemented in off-chip memory 122. In certain aspects, ring buffers 116 and 118 are implemented in on-chip memory 112 and/or other suitable locations.

Ring buffer 116 may include multiple buffers, one for each AV channel for transmission. Ring buffer 116 may receive the packetized data units from packetizer 110 and store the packetized data units. In this respect, ring buffer 116 may be allocated to every AV stream, and the transmitted AV data of each AV stream is continuously stored in ring buffer 116.

Similarly, ring buffer 118 may include multiple buffers, one for each AV channel for reception. Ring buffer 118 may receive depacketized data units from depacketizer 120 and store the depacketized data units in a specified received order (e.g., arrival order) or in a specified arranged order (e.g., sequential order).

In certain aspects, ring buffer 116 stores data units not marked for retransmission. Ring buffer 116 may have a known starting address and sequence number. AV data can be accessed for retransmission based on the sequence number associated with AV data for which retransmission has been requested. In some implementations, ring buffer 116 handles non-AV data for retransmission.

In some aspects, a flag (e.g. a payload-pointer advance (PA) flag) is provided for received AV streams. In this regard, the flag can point to the highest sequence number in ring buffer 118 in off-chip memory 122 for which the previous data packets have all been consumed. When the flag reaches a re-ordering point, the flag is published and any packets having a sequence number lower than the sequence number pointed to by the flag may be cleared (e.g., packets considered as processed). In this regard, the PA flag may reduce the number of memory accesses necessary by eliminating the need to read (or examine) each descriptor to determine how much of ring buffer 118 has been consumed.

In one or more implementations, a data structure (not shown) includes pointers to addresses of data items stored in ring buffer 118 or other ring buffer located in off-chip memory 122. A flag (e.g. a data-consumed (DC) flag) can be set to indicate how many items have been consumed from ring buffer 118. The items can then be cleared from ring buffer 118 based on locally stored addresses of the items that need to be reclaimed. In this regard, the need to revisit (or reexamine) the marked items with descriptors can be avoided, thereby reducing the number of memory accesses needed to reclaim the memory.

Re-Transmission Handling

Figure 2:
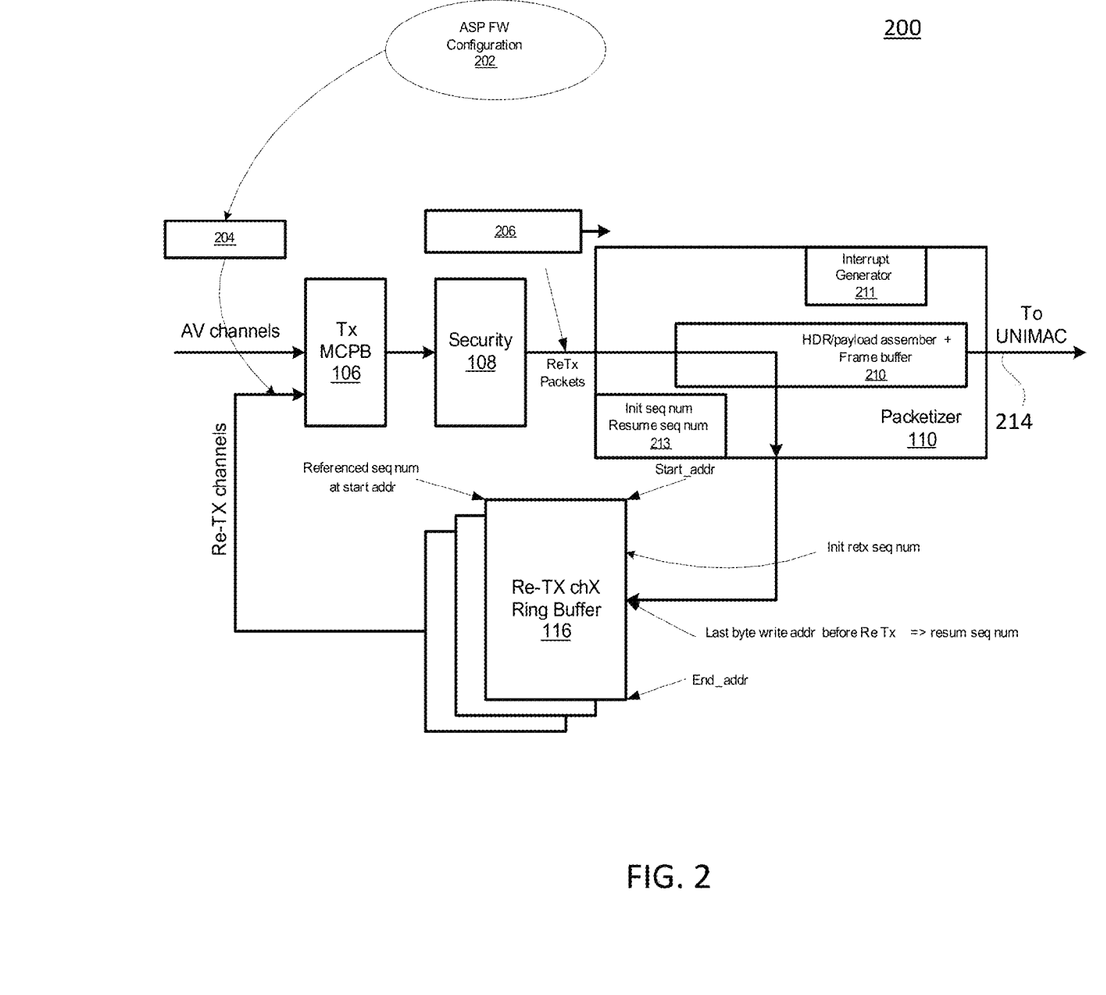
FIG. 2 is a block diagram illustrating components for retransmission handling and memory consumption tracking in the network device of FIG. 1, in accordance with various aspects of the subject technology.

FIG. 2 is a block diagram illustrating components for retransmission handling and memory consumption tracking in the network device 100 of FIG. 1, in accordance with various aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In some aspects, stream-out original AV TCP payload data (e.g., retrieved from DRAM by Multiplexer 106) is stored in retransmissions buffers in DRAM (e.g., ring buffer 116). There may be 32 retransmission ring buffers 116, one for each AV channel. In some implementations, TCP payload data is stored in ring buffers 116. Other types of data (e.g., header information) may be stored in ring buffers 116 depending on implementation.

In some aspects, transport stream packets include a data type indication to distinguish between packets for regular transmission and packets for retransmission. In this regard, transport stream packets marked as retransmission data may be identified by a specific data type (e.g., tagged or indicated as a retransmission payload), so the retransmission data is not stored twice in ring buffers 116.

There may be two initial sequence number registers assigned to each AV channel, where one sequence number register is assigned to normal stream-out transmissions, and another sequence number register is assigned to retransmissions. Packetizer 110 includes a sequence number module 213 that includes the sequence number registers for both initial normal stream-out and resuming normal stream-out transmissions. As used herein, the term "register" is a data structure for storing data, of which the register may be configured as read-only, write-only, or read and write accessible. The initial sequence number for a normal stream-out transmission may be set (or configured) by firmware of ASP 104 (e.g., ASP FW 202) before the channel starts the transmission. The initial sequence number for a retransmission may be set by ASP FW 202.

In some aspects, TCP payload data is stored in ring buffer 116. The first byte of the TCP payload data may be stored at a start address of ring buffer 116. The sequence number for the first byte is based on an initial sequence number set (or configured) by ASP FW 202 and stored in a hardware register (not shown). The initial sequence number may be updated by hardware each time a byte of the TCP payload data is written to (or stored at) the start address of ring buffer 116. ASP FW 202 may employ the initial sequence number to locate a first retransmission byte that matches a starting sequence number that ASP FW 202 decides to re-transmit. In turn, ASP FW 202 sends retransmission descriptor 204 to Multiplexer 106 that indicates where in ring buffer 116 to retrieve the retransmission data.

In certain aspects, a retransmitted Ethernet frame may have a TCP payload data segment associated with a sequence number that is different from a sequence number in an originally transmitted Ethernet frame. By way of example, the originally transmitted packets can become fragmented before reaching an IP destination address, which then the requested retransmission segments may no longer be aligned with the originally transmitted packets.

Packetizer 110 includes a header/payload assembler and frame buffer module 210 for encapsulating the incoming payload data from Multiplexer 106 and arranging the outgoing packets into a transmission frame (e.g., Ethernet frame). Packetizer 110 may advance a write address in ring buffer 116 and a corresponding sequence number each time a burst of TCP payload data is stored. In turn, ASP FW 202 may advance a read address in ring buffer 116 each time an acknowledgment (ACK) packet, which advances a TCP sliding transmission window, is received. In this regard, the TCP payload data including header information (e.g., PCP headers, HTTP headers) are stored in ring buffer 116 for retransmission.

In some aspects, if a retransmission buffer becomes full, an error status and an interrupt signal are generated by interrupt generator module 211 and stream-out data path 214 stalls. In certain aspects, packetizer 110 is configured to write without an overflow check of a local data buffer. In this respect, packetizer 110 does not advance the read address. Packetizer may advance the write address irrespective of the read address.

Multiplexer 106 may track the byte count of the TCP payload data forwarded to packetizer 110 and compare the byte count to an ACK number received from ASP FW 202 to determine if a next segment will be valid and within the TCP sliding transmission window. Multiplexer 106 may be configured to stop sending TCP payload data segments and advancing the corresponding sequence numbers if no ACK signal is received and the TCP sliding transmission window is greater than a window size threshold (e.g., the TCP sliding transmission window exceeds a window size agreed between a transmitter and receiver connection).

Figure 3:
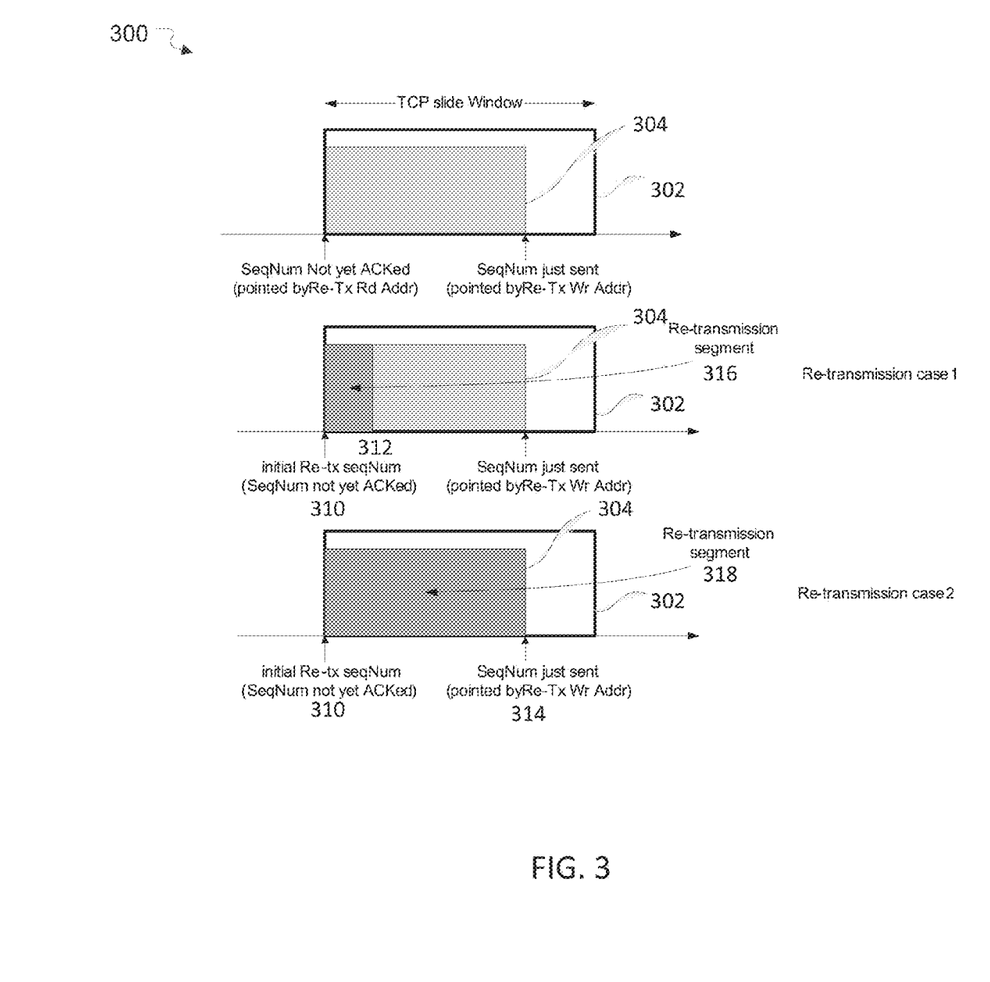
FIG. 3 is a block diagram illustrating components for retransmission handling in the network device of FIG. 1, in accordance with various aspects of the subject technology.

FIG. 3 is a block diagram illustrating components for retransmission handling in the network device 100 of FIG. 1, in accordance with various aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Once the firmware (e.g., ASP FW 202 of FIG. 2) decides to perform a retransmission, ASP FW 202 may instruct Multiplexer 106 to send a pause instruction to packetizer 110. Once packetizer 110 receives the pause instruction, packetizer 110 stops storing transmission data to the retransmission buffers (e.g., ring buffer 116) and generates an interrupt signal using interrupt generator module 211. Packetizer 110 then sends the interrupt signal to ASP FW 202 after the last byte of data is stored. In turn, the write address to ring buffer 116 is updated and the next sequence number is saved.

In some aspects, ASP FW 202 determines the sequence number at a start address of a respective ring buffer (e.g., one of ring buffers 116). In turn, ASP FW 202 compares an initial retransmission sequence number with the start address of the respective ring buffer to determine a read address and a data size for a retransmission segment. Once ASP FW 202 determines the read address and data size of the retransmission segment, ASP FW 202 may generate the retransmission descriptor 204 (FIG. 2) for Multiplexer 106. In turn, ASP FW 202 may instruct Multiplexer 106 not to transmit new TCP payload data packets and start retransmission based on retransmission descriptor 204. In addition, Multiplexer 106 also may send the initial retransmission sequence number using a dedicated instruction to packetizer 110.

Multiplexer starts the retransmission by sending an acknowledgment message including the initial retransmission sequence number and retransmission packets for corresponding data from retransmission buffer (e.g., ring buffer 116). Packetizer 110 receives the initial retransmission sequence number and the retransmission data (with data type set as retransmission). In some aspects, packetizer 110 may initiate retransmission frames (e.g., Ethernet frames) with a new initial retransmission sequence number. In this regard, the new initial retransmission sequence number may be different from the received initial retransmission sequence number.

In some aspects, a retransmitted segment needed either by selective acknowledgment or exceeded a TCP transmission slide window 302 are already stored in the retransmission buffer (e.g., ring buffer 116). In certain aspects, selective retransmission (e.g., a retransmission segment 316 including retransmission data between time 310 and time 312) and retransmission of the segments from a certain point in time up to a boundary with a segment recently transmitted (e.g., a retransmission segment 318 including retransmission data between time 310 and time 314). ASP FW 202 may be configured to set (or program) a proper retransmission data size based on the retransmission read and write addresses.

Once retransmission is done, packetizer 110 via interrupt generator module 211 may generate an interrupt and status signal to notify ASP FW 202 that the retransmission has completed. In turn, Multiplexer 106 may be configured to resume sending normal stream-out data, and packetizer 110 may be configured to resume storing TCP payload data and normal stream-out frames with the saved sequence number (e.g., the next sequence number when packetizer 110 interrupted to perform retransmission) as the new initial sequence number.

Figure 4:
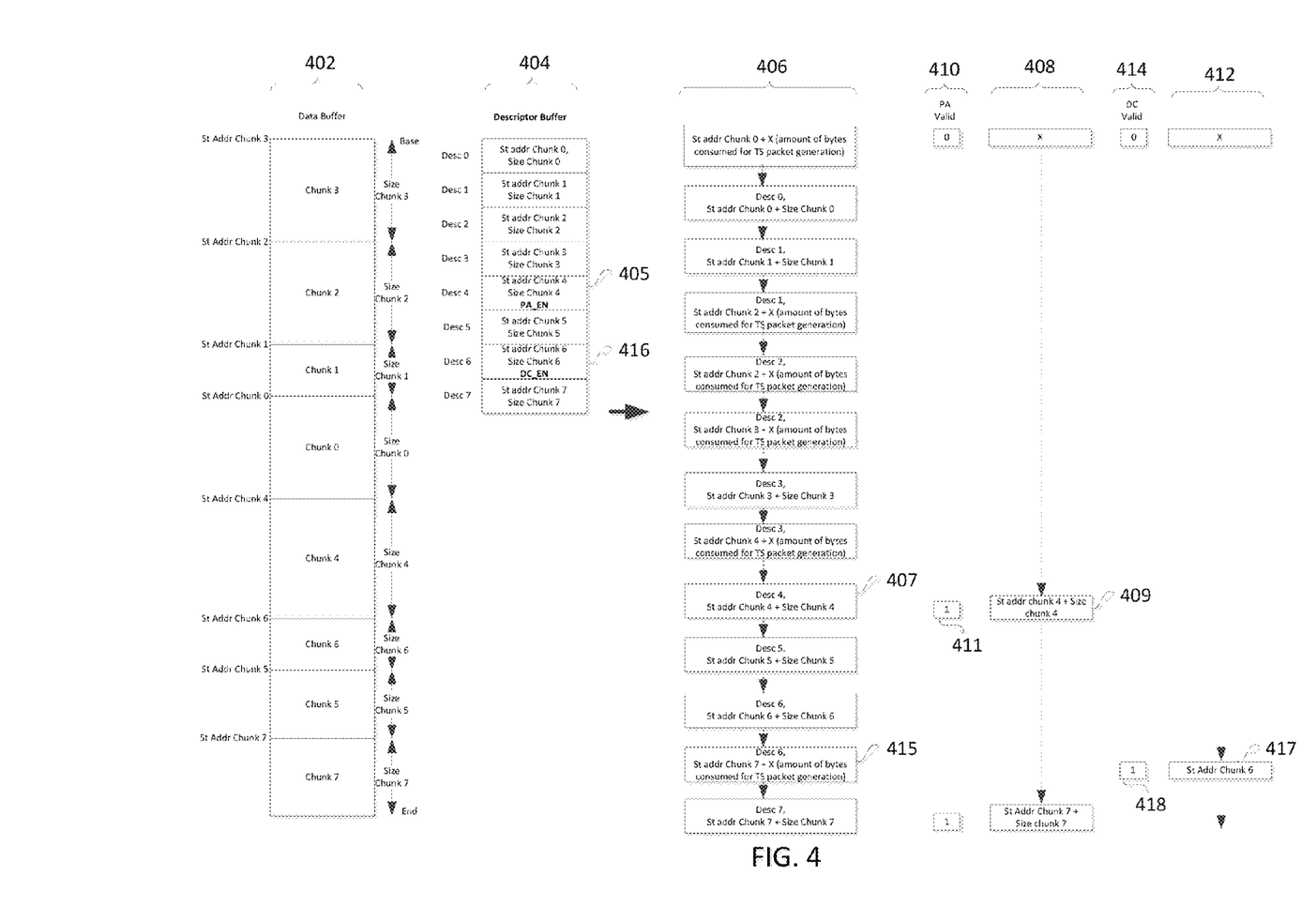
FIG. 4 is a block diagram illustrating components for memory consumption tracking using different examples of memory buffers of the network device of FIG. 1, in accordance with various aspects of the subject technology.

FIG. 4 is a block diagram illustrating components 400 for memory consumption tracking using different examples of memory buffers of the network device 100 of FIG. 1, in accordance with various aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The components 400 include a data buffer 402, a descriptor buffer 404, direct memory access (DMA) completed pointers 406, payload pointer registers 408, payload advance (PA) written flags 410, data pointer registers 412 and data consumed (DC) flags 414. The components 400 may be included in on-chip memory 112, off-chip memory (e.g., random access memory such as dynamic random access memory (DRAM)), and/or other suitable locations. Network device 100 may include a payload pointer register 406 per channel. In certain aspects, network device 100 includes a PA-written flag register bit (e.g., PA flag) per channel. Network device 100 also may include a data pointer register per channel and a DC written flag register bit (e.g., DC flag) per channel.

Payload Pointer Advance Handling

While receiving data over an IP network, chunks (or sometimes referred to as data units) of the data may be received in an out of order sequence. The out-of-order sequences may be fed by ASP FW 202 (FIG. 2) to DEMUX-DMA 126 in a corrected sequence. The DEMUX-DMA 126 may be located within ASP 104. In some aspects, the DEMUX-DMA 126 is communicatively coupled to ASP 104.

While such chunks are received, they are stored in data buffer 402. Data buffer 402 may be located on a receiver path of network device 100 (e.g., ring buffer 118 of FIG. 1). Data buffer 402 may be configured to store multiple chunks of data defined by respective start addresses and respective chunk sizes. Each of the chunk locations in data buffer 402 may vary in size. In some aspects, data buffer 402 is a circular ring buffer. In this regard, the chunks are received out of order and are continuously stored in data buffer 402 in the order received.

Even though multiple chunks are fed by ASP FW 202 to DEMUX-DMA 126, ASP FW 202 may maintain a list of descriptors supplied in descriptor buffer 404. Descriptor buffer 404 includes a number of descriptor entries based on a number of chunk entries of data buffer 402. Each of the descriptor entries of descriptor buffer 404 provides a start address and a chunk size of a corresponding chunk entry of data buffer 402.

As shown in FIG. 4, data buffer 402 stores chunks of data having an arrival sequence of {3, 2, 1, 0, 4, 6, 5, 7}. As such, chunk 0 through chunk 3 and chunk 6 arrived out of sequence. In this regard, payload pointers in successive descriptors may not advance the payload tail pointer of data buffer 402. In some aspects, certain descriptors advance the payload tail pointer.

The list of descriptors in descriptor buffer 404 may be maintained by ASP FW 202 and updated when the DEMUX-DMA 126 consumes one of the listed descriptors. Based on the consumed address update, the memory space may be reclaimed by ASP FW 202 and allocated for new usage. If on-chip memory 112 is used by ASP FW 202, maintaining the list of descriptors could be memory intensive.

To reduce the memory requirements of the descriptor list maintenance, a payload advance (PA) flag is added to the format of a descriptor. When a descriptor containing the PA flag is consumed by the DMA engine, ASP FW 202 is informed about the consumption of the descriptor having the PA flag set. In turn, ASP FW 202 can reclaim the memory used by the received IP chunks of data pointed out by the PA flag. The PA flag provides for important descriptor nodes in the list to be tracked instead of tracking every descriptor node. Such usage of the PA flag improves memory usage in ASP 104. In some aspects, the descriptor memory (e.g., descriptor buffer 404) up to the descriptor having the PA flag set is also reclaimed. In certain aspects, the descriptor memory includes the start address of an IP chunk along with an offset indicative of an amount of data consumed for packet generation.

In some aspects, network device 100 includes Demultiplexer 128 module that is communicatively coupled to ASP 104. When ASP FW 202 (FIG. 2) creates a descriptor for a DEMUX-read operation, ASP FW 202 sets (or programs) the PA flag if consuming a corresponding payload advances the payload tail pointer. When the Demultiplexer 128 is done absorbing (or consuming) a descriptor (e.g., last data byte irrevocably fetched from DRAM), and the descriptor has the PA flag set (e.g., descriptor 405), DEMUX-DMA 126 sets an event notification. ASP FW 202 may perform a write operation of a payload pointer (e.g., DMA completed pointer 407) to a corresponding register (e.g., payload pointer register 409). In this regard, the payload pointer register 409 may include a PA valid bit 411 to indicate that the payload pointer stored therein corresponds to a memory location available for reclamation. In some aspects, DMA completed pointers 406 are periodically copied by ASP FW 202 into a corresponding payload pointer register 408 for a payload-write circular buffer.

The DEMUX-read operation may be performed using only hardware (e.g., without FW intervention) by automatically updating tail pointer (e.g., location within DMA completed pointers 406) in a corresponding payload pointer register 408 over a wire bus. In this regard, the width of the wire bus would be proportional to the number of channels supported.

In some aspects, the PA written flag is set for segments which, when entering network device 100, are at a highest sequence number. If such packet was at UNA, at the time the packet is consumed, there are no additional packets expected to arrive after the packet on the wire that need to be sent to DEMUX-read earlier. In this regard, retransmissions are handled on-chip. If there were gaps when the packet arrived, by the time the payload of the received packet is consumed, the earlier-sequence/later-arriving bytes may have already been consumed from a higher address location in the payload-write buffer (e.g., chunk 3 versus chunk 0 as stored in data buffer 402). In addition, spans of chunk data may come either from a de-packetizer source or from a reassembly pool source. In this regard, the PA flag applies to data packet consumption relating to the de-packetizer source and ASP FW 202 can check address ranges to ensure that the payload pointer falls inside the address range of data buffer 402 to make the proper determination.

DMA Completion Handling

ASP FW 202 can receive messages about re-assembled IP datagrams, in which the message includes a pointer to a data buffer in shared memory. In some aspects, there is no ordering between the received messages, and the messages may belong to either transmission direction (e.g., receiver, transmitter). In some approaches, there is no linear or circular buffer to advance the tail of when consumed. In this respect, an approach directed to DMA completion (or data consumed) handling may be used for reclaiming packet buffers used for re-assembled IP datagrams.

When the chunks of data are scattered in memory, such chunks are provided by ASP FW 202 to the DEMUX-DMA 126 in terms of descriptors. Each descriptor may point to a start address of a respective chunk. If ASP FW 202 is feeding a list of descriptors (e.g., descriptor buffer 404) to DEMUX-DMA 126, ASP FW 202 may track the list of descriptors (e.g., descriptor addresses) so ASP FW 202 can determine an amount of memory that needs to be reclaimed after the DEMUX-DMA 126 provides completion updates on the consumed addresses.

Since the datagrams can be scattered, ASP FW 202 may account for each datagram individually. The scheme for the DMA completion handling may include maintaining in local data memory a circular buffer database (e.g., ring buffer 118 of FIG. 1) of payload addresses. In some aspects, ASP FW 202 tracks starting addresses of chunks pointed out by the list of descriptors instead of descriptor addresses. A flag (e.g., DC flag) can be provided within each of the descriptors. If the DC flag is present in the descriptor, the DEMUX-DMA 126 can provide a base address in memory pointed out by the descriptor of an associated chunk upon completion of the descriptor.

Each time a re-assembled datagram descriptor is appended for Demultiplexer 128, the circular buffer database may be updated with a corresponding payload address of the re-assembled datagram descriptor. As such, every time the data for a descriptor having the DC flag set is consumed, the Demultiplexer 128 may set (or write to) via the DEMUX-DMA 126 a register (e.g., data pointer register 417) with the address corresponding to the payload described in the descriptor. ASP FW 202 may periodically read the register. In turn, ASP FW 202 can parse through a start address list and reclaim any unused memory space.

As shown in FIG. 4, when the Demultiplexer 128 is done absorbing a descriptor (e.g., last data byte irrevocably fetched from DRAM), and descriptor 416 has the DC flag set, DEMUX-DMA 126 sets an event notification. ASP FW 202 may read the DMA completed pointers 406. In turn, ASP FW 202 may update a local buffer tracking list based on the DMA completed pointer (e.g., DMA completed pointer 415). Demultiplexer 128 may perform a register write operation to write data pointer information to a corresponding register (e.g., data pointer register 417) that reflects DMA completed pointer 415. In this regard, the data pointer register 417 may include a DC valid bit 418 to indicate that the payload addressed stored therein corresponds to the last fetched data.

For sizing the buffer space in the circular buffer database, the rate and size of an incoming data stream may be accounted for. By way of example, a data stream received at a data rate of 30 Megabits per second (Mbps), where each packet occupies 1300 bytes, yields approximately 3,000 packets per second. The sizing may account for retransmissions and PCP headers included in the packets. Based on an arrival queue of every 500 μs (e.g., the task period for received-header processing), an average of 1.5 packets per channel per activation (or approximately 50 packets per activation for all data streams) may be received and processed. An entry in the circular buffer database can be retained from the moment an incoming message is processed until an outgoing notification message of the consumption is queued.

Factors affecting the lifetime of an entry in the circular buffer database may include: (1) wait time to become in correct sequence, (2) queue time, and (3) wait time to be reclaimed. The first factor may increase when packets are re-ordered or re-transmitted (e.g., 6 milliseconds (ms) based on 3*round trip time (RTT) on a network connection). Time spent queued for DEMUX processing may be approximately 500 μs. The time spent before being reclaimed by ASP FW 202 and the notification being queued may be approximately 500 μs. Based on the aforementioned factors, there may be a latency of 7 ms, where 3000 packets per second over the latency can yield 21 messages in flight. To accommodate the number of messages, the circular buffer database may be configured to include 24 entries.

The circular buffer database may be organized as an array of 40-bit system address entries. A write index may be advanced when re-assembled datagrams are queued for Demultiplexer 128 processing and reclaim payload buffers may advance a read index after Demultiplexer 128 consumed the IP datagrams. The read and write indices can be stored as bytes to save storage.

Spans may come either from the depacketizer source or from the reassembly pool source. In this regard, the DC flag applies to the reassembly pool source and ASP FW 202 can verify the address ranges to ensure that payload pointer falls outside the payload buffer to make the proper determination.

In some aspects, to prevent a data stream from blocking (e.g., a packet in a current re-assembly message arrives when the circular buffer database is already full), ASP FW 202 can be configured to reclaim the last entry of the circular buffer database only if the packet can advance the database. Otherwise, the packet described in the current re-assembly message is immediately acknowledged as consumed and reclaimed. In turn, a remote device may have to re-transmit the packet based on an acknowledgment number sequencing or time-out expiration. In certain aspects, one entry in the circular buffer database is left unused to avoid aliasing between full and empty conditions. In this regard, the unused entry enables read and write indices to be updated independently, each with a single write operation.

Figure 5:
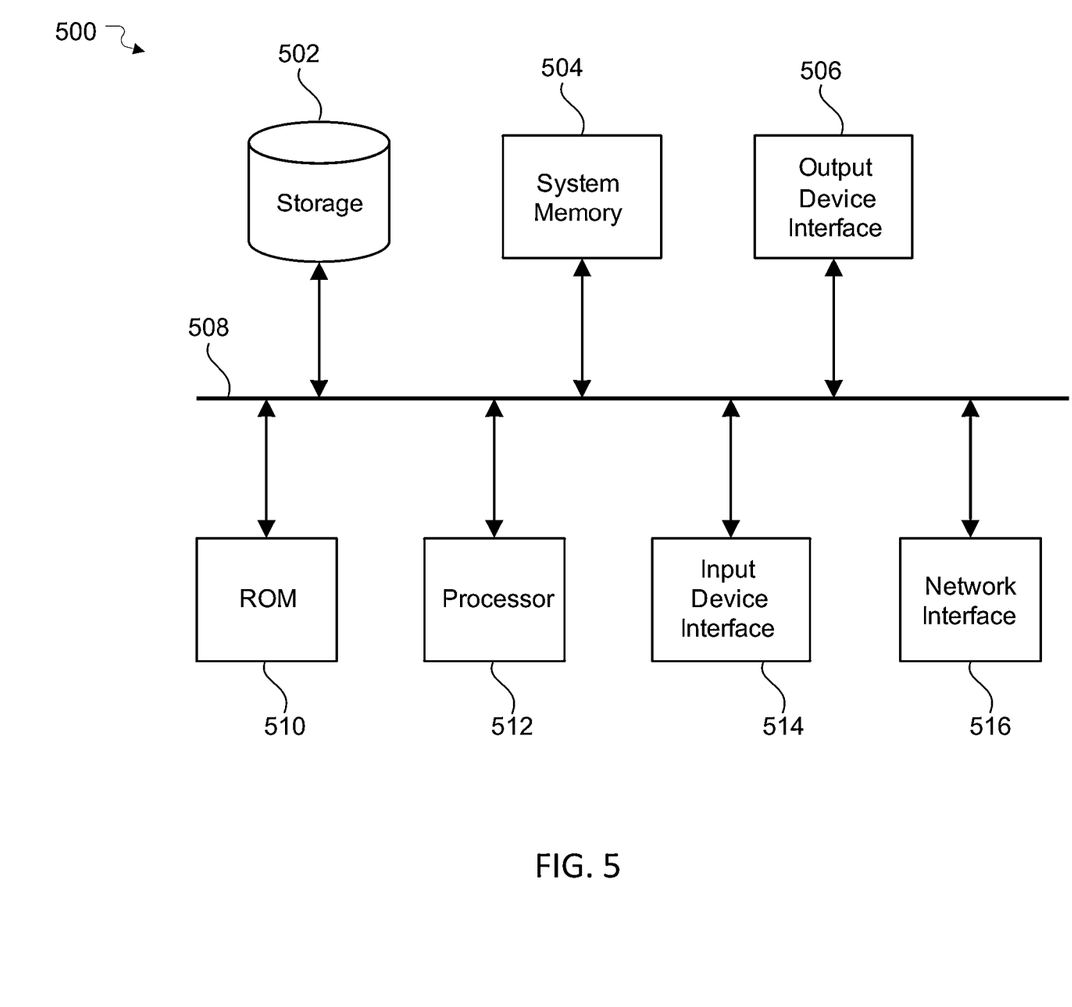
FIG. 5 conceptually illustrates an electronic system with which aspects of the subject technology may be implemented.

FIG. 5 conceptually illustrates an electronic system 500 with which one or more implementations of the subject technology may be implemented. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The electronic system 500, for example, can be a desktop computer, a laptop computer, a tablet computer, a server, a switch, a router, a base station, a receiver, a phone, a personal digital assistant (PDA), or generally any electronic device that transmits signals over a network. The electronic system 500 can be, and/or can be a part of network device 100 (FIG. 1). Such an electronic system 500 includes various types of computer readable media and interfaces for various other types of computer readable media. The electronic system 500 includes a bus 508, one or more processing unit(s) 512, a system memory 504, a read-only memory (ROM) 510, a permanent storage device 502, an input device interface 514, an output device interface 506, a local area network (LAN) interface 516, and a wide area network (WAN) interface 518, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a flash drive or a universal serial bus (USB) drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

In some aspects, the electronic system 500 includes a computer program product with instructions stored in a tangible computer-readable storage medium such as permanent storage device 502. The instructions may include instructions for receiving transport stream packets on respective ones of data channels, in which the transport stream packets of the respective ones of the data channels contain an input transport stream. The instructions also may include instructions for storing the transport stream packets for each of the respective ones of the data channels in one or more packet buffers associated with the respective data channel. The instructions also may include instructions for determining, for each of the data channels, if a timing maturity event of a corresponding input transport stream has occurred. Further, the instructions also may include instructions for outputting one or more of the stored transport stream packets from the one or more packet buffers associated with the respective data channel to generate a transmission packet if the timing maturity event of the corresponding input transport stream has occurred. The stored transport stream packets for generating consecutive transmissions packets may be output at a data rate based on a distance between timing maturity event occurrences of the corresponding input transport stream.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to a network (not shown) through the LAN interface 516 and separately, or jointly, through the WAN interface 518. In this manner, the electronic system 500 can be a part of a network of computers, such as a LAN through the LAN interface 516, a WAN through the WAN interface 518, an Intranet through either of the interfaces 516, 518, or a network of networks through either of the interfaces 516, 518, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of handling retransmission of data packets, the method comprising:
   facilitating transmission of a plurality of data packets on a plurality of data channels;
   for each of the plurality of data channels, determining if one or more of the plurality of data packets corresponding to the data channel is marked for retransmission;
   storing the one or more of the plurality of data packets corresponding to the data channel in a respective one of a plurality of ring buffers allocated to the plurality of data channels if the one or more of the plurality of data packets are not marked for retransmission, wherein the storing comprises advancing a write address and a corresponding sequence number for one of the plurality of ring buffers each time a burst of payload data is stored in the one of the plurality of ring buffers;
   determining a retransmission sequence number within a transmission sliding window;
   retrieving the stored data packets from the respective one of the plurality of ring buffers based on the retransmission sequence number;

facilitating retransmission of the retrieved data packets with the retransmission sequence number within a retransmission segment of the transmission sliding window; and advancing the transmission sliding window in response to receiving an acknowledgment packet that corresponds to the retransmission of the retrieved data packets.

2. The method of claim 1, wherein each of the plurality of ring buffers is associated with a respective sequence number, further comprising updating an initial sequence number register with an indication of a sequence number when a start address of a corresponding one of the plurality of ring buffers is written with data of the plurality of data packets.

3. The method of claim 2, wherein determining the retransmission sequence number comprises:
   determining a starting sequence number for retransmission;
   comparing the initial sequence number register with the starting sequence number;
   selecting one of the plurality of ring buffers based on the comparison; and
   determining a location within the one of the plurality of ring buffers that matches the starting sequence number.

4. The method of claim 1, wherein storing the one or more of the plurality of data packets corresponding to the data channel comprises storing the plurality of data packets not marked for retransmission one data channel at a time, wherein a transition from one data channel to another data channel is determined at a transmitter control protocol (TCP) packet boundary.

5. The method of claim 1, further comprising advancing a read address each time the acknowledgment packet is received.

6. The method of claim 1, further comprising ceasing advancement of the transmission sliding window if no acknowledgment packet is received and the transmission sliding window is greater than a window size threshold.

7. The method of claim 1, further comprising:
   determining whether to begin a retransmission process;
   providing a control signal to cease storage of data of the plurality of data packets not marked for retransmission if the retransmission process is determined to begin;
   providing an interrupt signal to cease a normal transmission process;
   updating the write address; and
   storing a next sequence number for the normal transmission process.

8. The method of claim 7, further comprising:
   obtaining a read address and a corresponding data size for the retransmission segment of the transmission sliding window based on the retransmission sequence number and the write address, wherein the write address corresponds to a sequence number directly before the next sequence number.

9. The method of claim 8, wherein the retransmission segment includes a boundary defined from a starting sequence for retransmission up to where transmitted packets have been acknowledged.

10. The method of claim 8, wherein the retransmission segment includes a boundary defined from a starting sequence for retransmission up to the next sequence number of the normal transmission process.

11. A device, comprising:
    one or more processor circuits configured to:
    facilitate transmission of a plurality of data packets on a plurality of data channels, each data packet of the plurality of data packets being associated with one of the plurality of data channels, wherein one or more data packets of the plurality of data packets are not marked for retransmission;
    store each data packet of the one or more data packets in one of a plurality of buffers based on one of the plurality of data channels associated with the data packet, wherein each of the plurality of buffers is associated with one of the plurality of data channels;
    advance a write address and a corresponding sequence number for one of the plurality of buffers each time a burst of payload data is stored in the one of the plurality of buffers;
    when a retransmission process is determined to begin:
       provide a control signal to cease storage of data of the plurality of data packets not marked for retransmission;
       provide an interrupt signal to cease a current transmission process, update the write address associated with the current transmission process, and store a next sequence number for the current transmission process;
       select one of the plurality of buffers based on a retransmission sequence number within a transmission sliding window, wherein the retransmission sequence number is associated with at least one data packet of the one or more data packets;
       retrieve the at least one data packet from the selected one of the plurality of buffers; and
       facilitate retransmission of the at least one retrieved data packet.

12. The device of claim 11, wherein the one or more processor circuits are configured to update an initial sequence number stored in an initial sequence number register associated with the selected one of the plurality of buffers when data of the at least one data packet is written at a start address associated with the selected one of the plurality of buffers.

13. The device of claim 12, wherein:
    the one or more processor circuits are further configured to determine a location associated with the at least one data packet in the selected one of the plurality of buffers based on the initial sequence number stored in the initial sequence number register and the retransmission sequence number, and
    the one or more processor circuits are configured to retrieve the at least one data packet from the selected one of the plurality of buffers based on the determined location.

14. The device of claim 11, wherein the one or more processor circuits are configured to associate data of the at least one data packet with a sequence number when the data of the at least one data packet is written at a start address associated with the selected one of the plurality of buffers, the sequence number being based on an initial sequence number stored in an initial sequence number register associated with the selected one of the plurality of buffers.

15. The device of claim 11, wherein the one or more processor circuits are further configured to:
    advance the write address associated with a first buffer of the plurality of buffers when a burst of payload data is stored in the first buffer; and
    advance a read address associated with a second buffer of the plurality of buffers when an acknowledgement packet associated with the second buffer is received.

16. A computer program product comprising instructions stored in a tangible non-transitory computer-readable storage medium, the instructions comprising:
    instructions to facilitate transmission of a plurality of data packets on a plurality of data channels, each data packet of the plurality of data packets being associated with one of the plurality of data channels, wherein one or more data packets of the plurality of data packets are not marked for retransmission;

instructions to store each data packet of the one or more data packets in one of a plurality of buffers based on one of the plurality of data channels associated with the data packet, wherein each buffer of the plurality of buffers is associated with one of the plurality of data channels, wherein each buffer of the plurality of buffers is associated with a respective start address and a respective initial sequence number register, and wherein the respective initial sequence number register of each buffer comprises an indication of a respective initial sequence number associated with a respective data packet stored at the respective start address of the buffer;

instructions to select one of the plurality of buffers based on a retransmission sequence number within a transmission sliding window and the respective initial sequence number register of each buffer of the plurality of buffers, wherein the retransmission sequence number is associated with at least one data packet of the one or more data packets;

instructions to retrieve the at least one data packet from the selected one of the plurality of buffers; and instructions to facilitate retransmission of the at least one retrieved data packet within a retransmission segment of the transmission sliding window.

17. The computer program product of claim 16, wherein the instructions further comprise instructions to update the respective initial sequence number stored in the respective initial sequence number register associated with the selected one of the plurality of buffers when data of the at least one data packet is written at the respective start address associated with the selected one of the plurality of buffers.

18. The computer program product of claim 17, wherein the instructions further comprise instructions to determine a location associated with the at least one data packet in the selected one of the plurality of buffers based on the respective initial sequence number stored in the respective initial sequence number register associated with the selected one of the plurality of buffers and the retransmission sequence number, wherein the retrieving is based on the determined location.

19. The computer program product of claim 16, wherein the instructions further comprise:

instructions to advance a write address and a corresponding sequence number for one of the plurality of buffers when a burst of payload data is stored in the one of the plurality of buffers; and instructions to advance the transmission sliding window in response to receiving an acknowledgment packet that corresponds to the retransmission of the at least one retrieved data packet.

20. The computer program product of claim 16, wherein the instructions further comprise determining a read address and a data size associated with the retransmission segment based at least on the retransmission sequence number within the transmission sliding window and the respective initial sequence number register of each buffer of the plurality of buffers.

* * * * *